United States Patent
Jadus et al.

(10) Patent No.: US 9,256,570 B2
(45) Date of Patent: Feb. 9, 2016

(54) I²C ISOLATED, BIDIRECTIONAL COMMUNICATION SYSTEM WITH ISOLATED DOMAIN CURRENT SOURCE PULL-UPS

(75) Inventors: Brian K. Jadus, Willston, VT (US); Steven Tanghe, Essex Junction, VT (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 513 days.

(21) Appl. No.: 13/204,327

(22) Filed: Aug. 5, 2011

(65) Prior Publication Data

US 2013/0036247 A1 Feb. 7, 2013

(51) Int. Cl.
*G06F 13/14* (2006.01)
*G06F 13/42* (2006.01)
*G06F 13/40* (2006.01)

(52) U.S. Cl.
CPC ........ *G06F 13/4295* (2013.01); *G06F 13/4045* (2013.01)

(58) Field of Classification Search
CPC .......................... G06F 13/4045; G06F 13/4295
USPC .......................................................... 710/314
See application file for complete search history.

(56) References Cited

U.S. PATENT DOCUMENTS

| 4,097,766 | A | * | 6/1978 | Renirie | 327/562 |
| 5,790,526 | A | * | 8/1998 | Kniess et al. | 370/257 |
| 6,014,040 | A | * | 1/2000 | Tracy | 326/90 |
| 6,725,320 | B1 | * | 4/2004 | Barenys et al. | 710/316 |
| 6,874,052 | B1 | * | 3/2005 | Delmonico | 710/305 |
| 2002/0053925 | A1 | * | 5/2002 | Anderson et al. | 326/82 |
| 2004/0225812 | A1 | * | 11/2004 | Ervin | 710/305 |
| 2004/0225814 | A1 | * | 11/2004 | Ervin | 710/305 |
| 2006/0075170 | A1 | * | 4/2006 | Behrendt et al. | 710/110 |
| 2006/0290381 | A1 | * | 12/2006 | Bui et al. | 326/91 |
| 2008/0034134 | A1 | * | 2/2008 | Kumar | 710/61 |
| 2008/0098147 | A1 | | 4/2008 | Amano | |
| 2009/0028226 | A1 | * | 1/2009 | Bliss et al. | 375/220 |
| 2009/0206875 | A1 | * | 8/2009 | Tran et al. | 326/38 |
| 2011/0038195 | A1 | * | 2/2011 | Hamilton et al. | 365/148 |

FOREIGN PATENT DOCUMENTS

| WO | 02/15013 A2 | 2/2002 |
| WO | 02/047339 A2 | 6/2002 |
| WO | 2009/013008 A2 | 1/2009 |

OTHER PUBLICATIONS

European Search Report dated Nov. 4, 2014 issued in EP 12005563.7.
Partial European Search Report dated Dec. 13, 2012 issued in EP 12005563.7.

* cited by examiner

*Primary Examiner* — Nimesh G Patel
(74) *Attorney, Agent, or Firm* — McDermott Will & Emery LLP

(57) ABSTRACT

This disclosure describes a circuit implementation providing the functions necessary to implement an isolated I²C bidirectional port. The technique implements a current source as a pull up device on at least one side of the isolation system. The circuit manages and communicates bidirectional data across an isolation barrier. A method of communicating bidirectional signals and an I²C acknowledge (ACK) or clock stretching through an isolation channel is disclosed.

4 Claims, 7 Drawing Sheets

FIGURE 5: Master Domain Logic Process

I²C ISOLATED, BIDIRECTIONAL COMMUNICATION SYSTEM WITH ISOLATED DOMAIN CURRENT SOURCE PULL-UPS

CROSS-REFERENCE TO RELATED APPLICATION

None

BACKGROUND

1. Field

This application disclosure relates generally to I²C isolated, bidirectional communication systems, including isolated domain current source pull-ups, and features to detect data direction, maintain signal direction and detect an I²C acknowledge (ACK) signal.

2. Overview

Physical implementations of I²C bidirectional systems typically employ a bidirectional wired NOR bus using two wires to respectively communicate clock (SCL) and data (SDA) signals. The bus signal is commonly pulled up with a resistor or a current source and its value is defined by the system capacitance and maximum low voltage level (VOL) of a pull down device. Current I²C architectures can support one master or multiple master devices and from one to 127 slave devices. An ACK condition is a low input signal from a slave device on an SDA pin indicating the slave device has received a byte of data. The ACK signal may occur when the master device is in process of pulling down the signal and must be detected and communicated in an isolated system. Slave devices may incorporate clock stretching on the SCL pins. Clock stretching has a similar signature as an ACK signal, by pulling down and holding the clock signal initiated during the low portion of the clock phase.

DESCRIPTION OF RELATED ART

A known technique in I²C communications is to drive a signal low and sense a ACK signal by driving the signal to a voltage at, above, or just below the maximum low voltage level (VOL) defined by the I²C specification, and sensing an external device pulling the voltage lower. The information is then fed back to indicate an acknowledgement has occurred. These techniques are implemented in isolation devices.

One disadvantage of the technique of driving the signal just above the specification levels is that it reduces the noise margin of the system. Cascading devices with the same techniques may not result in valid data transitions. Competitive devices and part-to-part variation may use different voltage levels confusing the devices margin in detecting an ACK condition.

SUMMARY

In accordance with one aspect, a communication system contains two or more communication interface devices for communicating between separate I²C busses, and each communication interface device comprises:

a current source connected to one of the I²C buses and arranged to pull the one I²C bus to a logic high level in the absence of an active pull down device on the one I²C bus;

a pull down component connected to the one I²C bus arranged to pull down the one I²C bus to a logic low level; and a detector configured to detect when a remote communication interface device is pulling the signal level on the one I²C bus to a logic low level meeting the I²C specification at the same time the communication interface device is pulling the signal level on the bus to a valid logic low meeting the I²C specification.

In accordance with another aspect, a communication system contains two or more communication interface devices for communicating between separate I²C busses each containing one or more remote I²C devices, with each communication interface device comprising:

a logic and storage device configured to maintain the direction of the data flow on one of the I²C buses based on which system pulls the signal from a logic high to a logic low first.

In accordance with yet another aspect, a communication system contains two or more communication interface devices for communicating between separate I²C busses each containing one or more remote I²C devices, and each communication interface device comprises:

a slew direction detector for sensing the direction of signal change on one of the I²C bus; and a logic device for responding to the output of the slew detector so as to block the input path when die communication interface device releases a pull down so as to avoid erroneously communicating the low condition to the opposing separate I²C bus.

In accordance with still another aspect, a communication system contains two or more communication interface devices for communicating between separate I²C busses, and each communication interface device comprises:

a programmable current supply; and a current controller configured to control the programmable current supply so as to provide a boost current when the communication interface device releases a pull down so as to reduce the rise time of the transition of the signal level on one of the I²C bus changing from a logic low to a logic high.

In accordance with yet another aspect, a communication system contains two or more communication interface devices for communicating between separate I²C busses, and each communication interface device comprises:

a programmable current supply;

an internal pull down component; and a current controller configured to control the programmable current supply so as to provide a first current corresponding to a logic low if the output of the communication interface device is pulled low by the internal pull down component, and a second current corresponding to a logic high if the output is not pulled low by the internal pull down component.

In accordance with still another aspect, a method, performed within a communication system containing two or more communication interface devices, of communicating between separate I²C bidirectional busses, with the method comprising:

detecting and maintaining the direction of data flow from one of the bidirectional buses including monitoring signals on the one bidirectional bus.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

In the drawings.

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
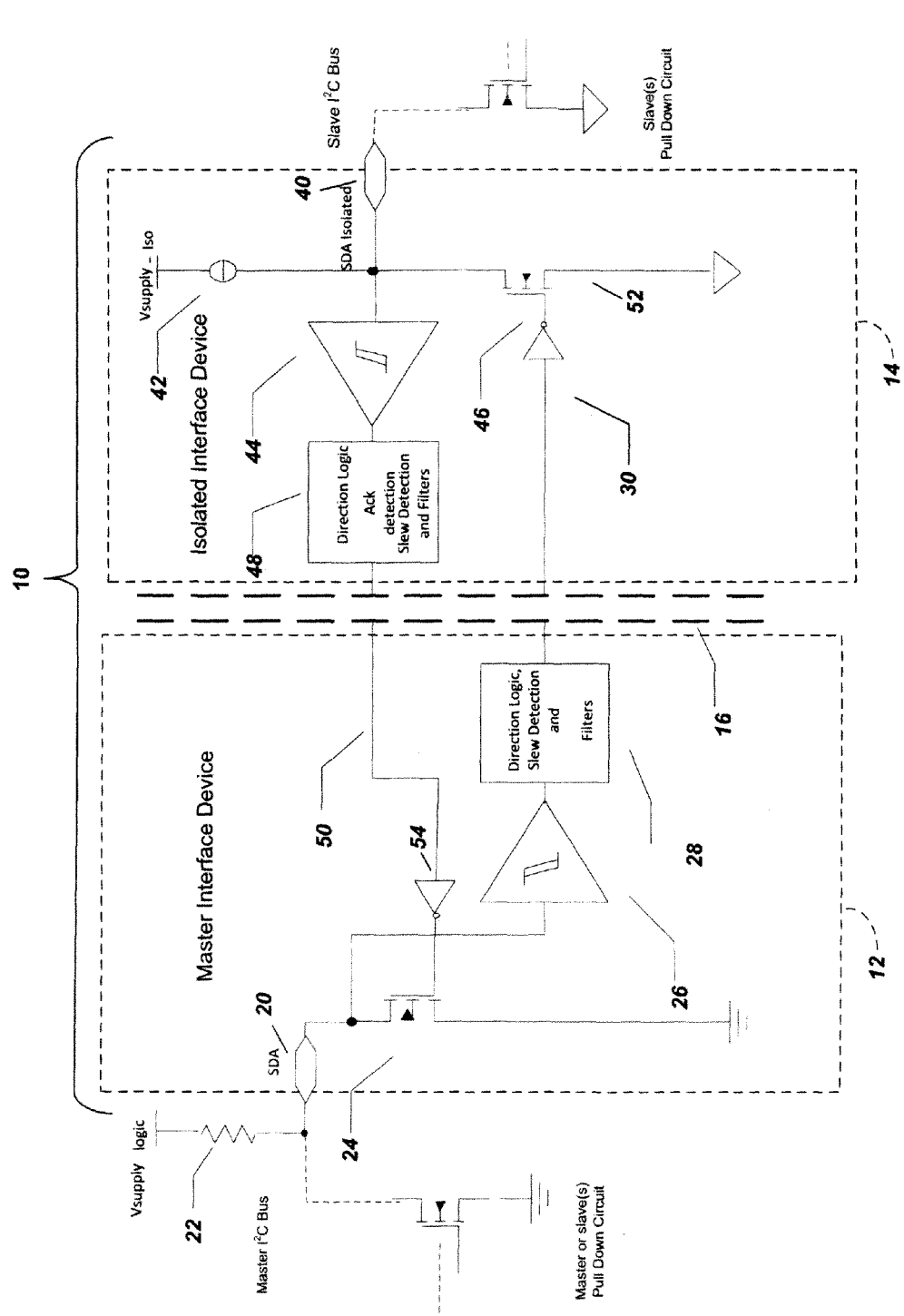
FIG. 1 is a block diagram of an embodiment of an architecture providing I²C communications across an isolation barrier; and including a bidirectional signal path with a current source configured in accordance with one aspect of the invention.

FIG. 1 illustrates a block diagram of one embodiment of a communication system 10 comprising an isolated I²C bidirectional signal path. In accordance with various aspects of the invention, the illustrated system 10 includes at least one master interface device 12 and at least one isolated interface device 14. System 10 relies on multiple parts to transfer data, maintain the data direction, sense an acknowledge (ACK) condition, and support the functions defined in the standard I²C specification. The master interface device 12 provides an interface between one or more external I²C de vices, connected to the master domain I²C bus, and the isolated interface device Similarly, the isolated interface device 14 provides an interface between one or more external slave devices, connected to the isolated domain I²C bus, and the master interface device. Data is transferred between the two interface devices through one or more isolation components which define an isolation barrier 16. The master interface device 12 includes a pull-down device 24 connected to the SDA pin 20, capable of sinking the current provided from an external pull-up device such as a resistor 22, and resulting in a low SDA pin voltage. The SDA port 20 is also connected to the logic input stage 26, which in turn is connected to direction logic, slew direction detection and filter block 28, the purpose of which will be more apparent hereinafter. The block 28 provides an output across the isolation barrier 16 along signal path 30 to the pull down device 46 of isolated interface device 14.

Isolated interface device 14 connects to a slave I²C bus, where one or more external slave devices are connected, each containing a pull down device for signaling. An SDAisolated port 40 for receiving and transmitting SDAisolated signals is connected to a current source, shown as an internal current source 42, logic input stage 44, and pull down device 46. Logic input stage 44 is connected to the direction logic, ACK detection, slew direction detection and filter block 48, the purpose of which will also be more apparent hereinafter. The output of block 48 is applied across the isolation barrier 16 along signal path 50 to the pull down device 24 of the master device 12.

The isolation barrier can be provided by one or more components, and can be, for example, a capacitor, transformer, giant magnetoresistance (GMR), Hall effect, optocoupler or other similar device. Pull up devices 24 and 46 are shown as FETs, although other devices can be used. Because of the nature of the FETs and the logic state of the signals provided along signal paths 30 and 50, logic inverters 52 and 54 can be provided so that that the FETs forming the pull down devices 24 and 46 operate in the correct polarity.

In FIG. 1, the bidirectional data signals SDA and SDAisolated are linked through the isolation barrier 16 via devices 12 and 14. The bidirectional signaling of data signals SDA and SDAisolated is separated into two data paths 30 and 50 and communicated across the isolation barrier in the following way: The signal on path 30 represents the state of SDA as it is passed from the master interface device to the isolated interface device where it acts to replicate this state on SDAisolated. Similarly, the signal on path 50 represents the state of SDAisolated as it is passed from the isolated interface device to the master interface device where it acts to replicate this state on SDA. Both pins, SDA and SDAisolated, are never pulled down at the same time by external devices except during an ACK condition, which is detected by block 48 in the isolated interface device 14. Without the improvements described herein, this arrangement would cause a low bus lockup condition whereby a low signal on one side of the barrier causes a low on the other side, which then sends back a reinforcing low to the first side. A lock up condition will disable the functioning of the communication bus to transmit additional pulses, until the lock up condition is removed.

The embodiments of the systems and methods described herein are configured to manage the direction of data across the isolation barrier 16 to avoid lock up conditions and detect an acknowledgement signal ACK. In the illustrated embodiments this is done with a current source 42 which is used to pull up on the device 14 on the isolated domain side of the barrier 16. A common technique is to implement a resistor as the pull up device and size this resistance according to a voltage output low (VOL), rise time, and fall time requirements of the output signals. The system illustrated in FIG. 1, includes a controlled programmable current source that reduces the current level to maintain proper VOL when pulling down internally and increases the current when the internal pull down is disabled to increase switching speed. Further, as will be apparent hereinafter, the current source is implemented with an ACK detector, for example in the form of a signal comparator, to detect ACK conditions. Additionally a slew direction detector determines a rising or falling event on inputs to mitigate transmitting a logic low signal when the signal is released and in the process of rising to the logic input high threshold.

Referring still to FIG. 1 the master interface device bidirectional SDA port 20 is pulled up with the current source formed by resistor 22. The port 20 is also connected to a pull down device 24 and logic input stage 26. The input to the pull down device 24 is a signal provided by isolated interface device 14 through isolation barrier 16 along signal path 50. The output of the logic input stage 26 connects to direction logic 28, which preferably includes a glitch filter and slew direction detector, as will be described in greater detail hereinafter. The direction logic 28 monitors the signal state of SDA port 20 and data path 50, which is used to engage pull-down device 24. If the signal on data path 50 indicates that the pull down device 24 is actively pulling SDA down, then a low value observed on SDA is blocked from being transmitted across the barrier on signal 30, where it would otherwise contribute to a bus lock up condition.

The SDAisolated port 40 of the isolated interface device, is also bidirectional and is pulled up through internal current source 42. The logic input stage 44 connects to a direction logic, ACK detection, slew direction detector and filter block 48. The block 48 determines if a signal can be sent across the isolation barrier 16 from the isolated interface device 14 to the master interface device. If the input to the pull down device 46 is active, i.e., pulling down, the signal is ignored from the logic input stage 44 unless an ACK signal is detected.

Figure 2:
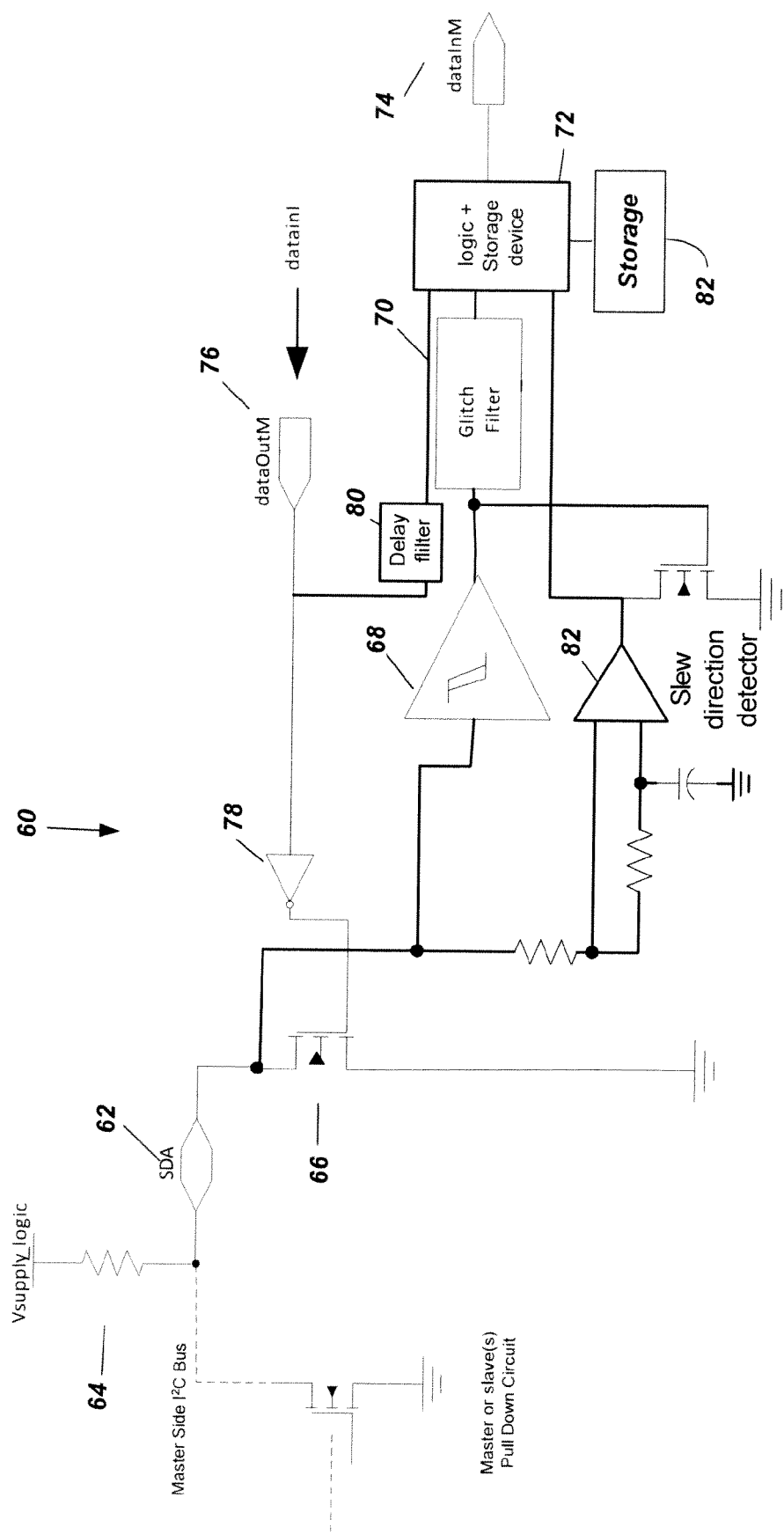
FIG. 2 is an embodiment of a master interface device of the type shown in FIG. 1.

FIG. 2 illustrates one embodiment of the master interface device 60 comprising a bidirectional SDA port 62 with direction logic. The master domain SDA port 62 is connected to an external current source formed by a pull up resistor 64 connected to a voltage source, pull down device 66, and logic input stage 68. The logic input stage 68 is in turn connected to glitch filter 70 and a logic device 72. Device 72 includes storage 82 and is connected to dataInM pin 74. The dataInM signal at pin 74 communicates through the isolation barrier 16 (of FIG. 1) to the isolated interface device. The device 60 receives data from the isolated interface device through the dataOutM pin 76. The dataOutM signal at pin 76 is an isolation domain dataInI signal communicated across the isolation barrier 16 (of FIG. 1) and applied to inverter 78 so as to provide a control input to pull down device 66. This signal is also applied through a time delay device 80 to logic device 72. SDA port 62 of the master interface device 62 functions to maintain die direction of the data. If the value of the dataOutM signal at pin 76 indicates that the SDA pin is not driven, the direction logic will enable the input signal at the SDA pin 62 to propagate to die isolation barrier 16. When the value of the signal at dataOutM pin 76 indicates that the SDA pin 62 is driven low, the direction logic will not allow the input signal at SDA pin 62 to propagate and holds the signal at the dataInM pin 74 in an un-driven state. This function disables a logical latch from occurring when a low is detected on one port (or pin) and is transferred to the opposing port (pin), where it is detected and transferred back to die original port as a low. A slew direction detector 82 monitors the input signal at the port 62 for rising, falling, or static information. When the dataOutM signal at pin 76 is high, releasing pull down circuit 66, die slew direction detector 82 indicates the direction that the SDA signal is moving so as to determine if an external device is pulling the signal down or if the signal is rising due to the pull up resistor 64. If the SDA signal is rising the output signal at the DataInM pin 74 is blocked until the logic input stage 68 confirms the signal has reached a logic high. If the SDA signal is maintained as a logic low level from an external source or rises then falls, the DataInM signal will be un-blocked allowing the value on the glitch filter 70 from the logic input stage 68 to pass. The slew direction detector function removes a glitch from occurring when dataOutM 76 releases the SDA pin to rise and while rising an input low is detected by the logic input stage 68 before the SDA pin 20 reaches a valid high input voltage. Thus, the logic 72 is used to determine when data is being transmitted, and the direction of the transmitted data.

Figure 3:
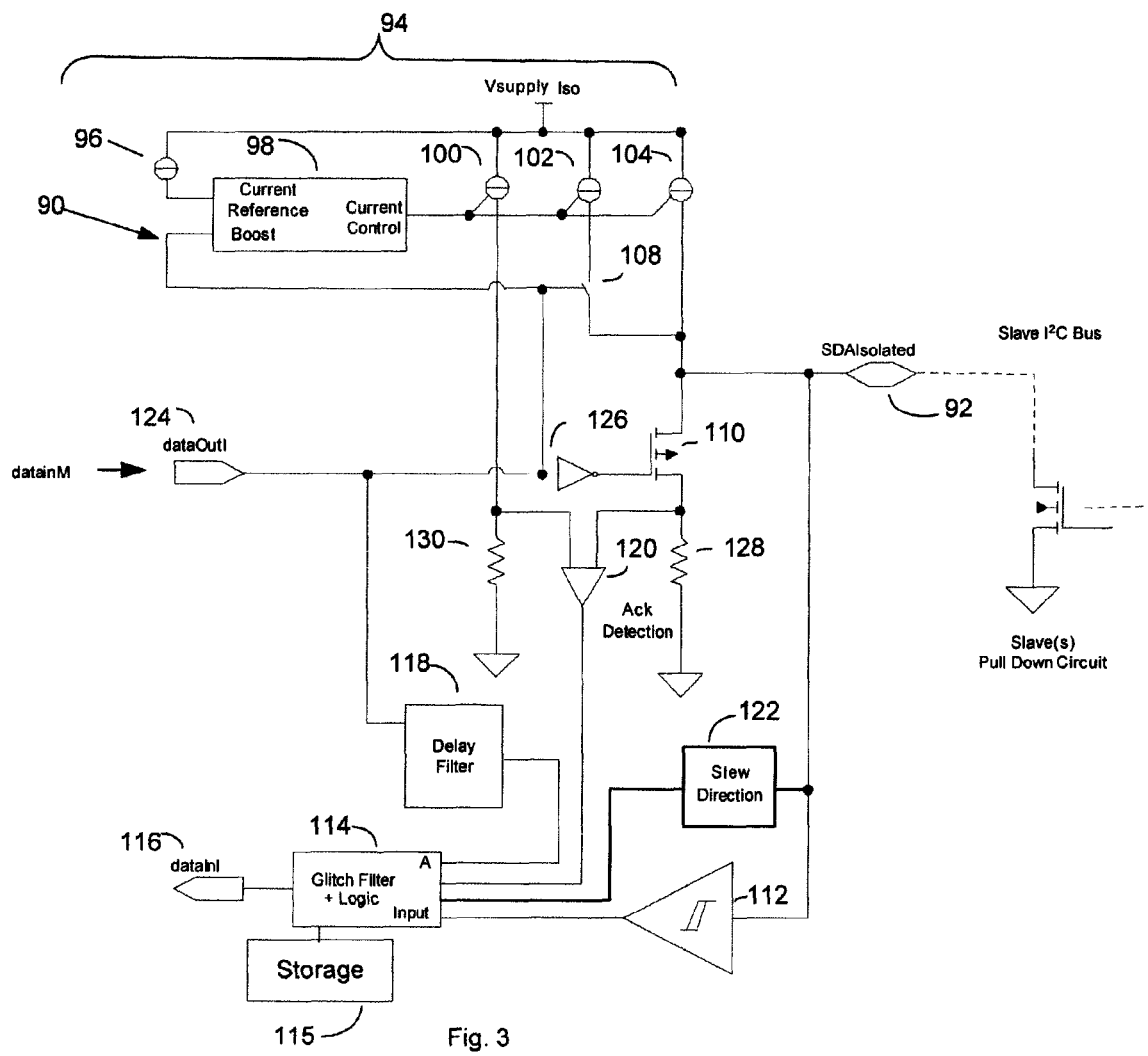
FIG. 3 is an embodiment of an isolated interface device of the type shown in FIG. 1.

FIG. 3 shows one embodiment of the isolated interface device. The illustrated device at 90 includes more details of an example of a detection logic, ACK detection, slew detection and glitch filter block shown generally at 48 in FIG. 1. The device 90 includes an isolated domain (SDAisolated) port 92. The latter is connected to an internal programmable current source array 94 shown as including a source current supply 96, a current controller 98 and three programmable current sources 100, 102 and 104. Current controller 98 includes a current reference input for receiving current from the supply 96, a current control output for addressing each programmable current source 100, 102 and 104, and a boost output connected to a programmable switch 108 and to the input of inverter 126. SDAIsolation port 92 is connected directly to current source 104, and through switch 108 to programmable current source 102 from dataOutI pin 124. Current sources 102 and 104 function to pull up the SDAisolated port 92 when programmed to do so. SDAIsolation port 92 is also connected to pull down device 110 shown as an FET, and logic input stage 112. Logic input stage 112 is connected to the input of glitch filter and logic block 114, which in turn is connected to memory 115 and has its output connected to provide a dataInI signal to pin 116, which is connected to the isolation barrier. Glitch filter and logic block 114 is also connected to receive an input from delay filter 118, the ACK detector 120 and the slew direction detector block 122. Glitch filter and logic block 114 is enabled if an ACK signal is detected from the ACK detector 120, if the slew direction detection block 122 determines that the signal at the SDAIsolation port 92 is not rising.

An input dataOutI pin 124 receives the dataInM 74 signal from the master interface device through the isolation barrier. Pin 124 is connected to an input of delay filter block 118. Pin 124 is also connected to inverter 126, which in turn controls the state of the pull down device 110. In the illustrated embodiment the ACK detector 120 is a comparator having one input coupled to a resistor 128 and to the pull down device 110, and its other input coupled to a resistor 130 and the programmable current source 100. The voltage across resistor 128 is a function of the current flowing from programmable current source 104 when pull down device 110 is enabled. The voltage across resistor 130 is a function of the current flowing from programmable current source 100.

In operation, when the signal dataOutI at pin 124 is high, disabling the pull down device 110, the current from current source 102 is added through switch 108 to current from current source 104 so as to accelerate or boost the pull up current, reducing the rise times from external device responses. When the signal dataOutI at pin 124 is low, enabling pull down device 110, switch 108 is open reducing the current drawn from the current source array 94 to only one current source 104 so as to set the current to a fraction (e.g., ⅓) of the specified current to meet VOL requirements to operate the pull down device 110.

Figure 4:
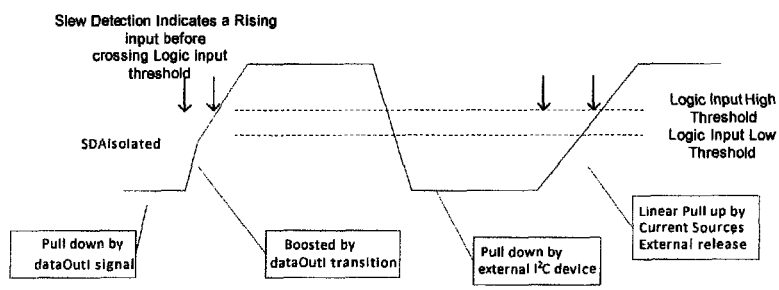
FIG. 4 a waveform showing a typical SDA signal generated under isolated signal conditions of the type described herein.

DataOutI 124 receives the signal dataInM 74 of the master interface device 60 through the isolation barrier. Pin 124 is connected to inverter 126, the output of which controls the state of the pull down device 110. As illustrated in FIG. 4, on the transition of the signal dataOutI at pin 124 from an low to high state, the current provided from current sources 102 and 104 increases (boosts) so as to pull up the output SDAisolated pin 92 for a percentage of the PC specified rise time. The current sources 102 and 104 pull the voltage of the SDAisolated signal at port 92, while the slew direction detector 122 indicates that the signal is rising. The output of the slew direction detector mitigates against the device responding to a false low and communicating it to the master interface device.

An ACK condition is a condition when an external device is pulling the SDAisolated pin 92 low to acknowledge that a communication has been received across an external device across the isolation barrier. In general, when a master interface device finishes writing a byte of data, the master interface device expects an acknowledgement (in the form of an ACK) on the next clock cycle. The acknowledgement is made by pulling down the voltage at the SDAisolated port 92, and the master domain reads that. It is possible that the acknowledgement starts before the last bit of the byte is released from the master interface device. Thus, both devices are pulling down on the bus at the same time. Thus, it is desirable to recognize that situation where both are pulling down on the bus at the same time so as to prevent lock up. As described above, the ACK detector functions as a comparator. Under normal conditions, resistor 130 receives current from source 100, while resistor 128 receives current from source 104. When the signal from the master device appearing at pin 124 is telling the device 110 to pull low, device 110 is sinking all of the current that current source 104 is supplying, and the ACK detector recognizes that condition because of the voltage appearing across resistor 128. If an external signal appears on pin 92 pulling it down, a majority of the current flowing from source 104 flows through the pin to the external device (e.g., the slave I$^2$C device), and will no longer flow through the resistor 128 of the ACK detector input. The ACK detector will acknowledge this by providing an output to the glitch filter and logic block 114, which provides a signal at pin 116, which is read by the master interface device through the isolation barrier. In this way the master interface device detects and reports an ACK signal.

The additional current source 102 and switch 108 are provided so as to enable a boosted additional current at the release of an internal pull down so as to reduce the rise time on the output signal. When the input signal at pin 124 is low, it is driving device 110 high so as to drive pin 92 low. When pin 124 goes high so as to release the low condition on pin 92, during the transition the switch 108 is closed so as to add the current from source 102 to the current flowing from source 104. In addition the current from source 102 flows to the boost input of the block 98. This results in an increase in pull up current for a limited time. This accelerates the pull up on the pin 92 for a limited time. This response is illustrated by the waveform shown in FIG. 4. Note that the boost is only provided for part of the transition. At such time the boost goes away and the device continues to operate drawing currents from sources 102 and 104. The boost enables the device to reduce the propagation delay in driving a capacitive load connected to pin 92 faster than otherwise would be accomplished without the additional pull up current.

When the dataOutI signal at pin 124 is high, disabling pull down device 110, and normal data patterns or an ACK condition occurs, the signal is processed through the logic input stage 112 and the glitch filter and logic block 114. When the dataOutI signal at pin 124 is enabling pull down device 110, the signal path from the SDAisolated pin 92 though the logic input stage 112 to the dataInI pin 116 is blocked. When an ACK condition occurs prior to a disable signal state at dataOutI pin 124, the ACK is detected with ACK detector 120 by sensing the difference between the voltages across resistors 128 and 130. The current flowing through each of the resistors 128 and 130 is controlled by current sources 100, and 102 and 104, respectively. The internal pull down device 110 is weak and the current source 104 current is set low to a predetermined fraction (e.g., ⅓) of the specified current to meet VOL requirements. When greater than half of this current is diverted externally, the ACK detector comparator 120 detects die voltage difference generated by the current change in resistors 128 and 130, which sets the ACK detection so that an output is provided at the output of the ACK detector 120 to the glitch filter and logic block 114. The signal is enabled though to block 114, then to the dataInI signal pin 116 for communication to the master interface device.

Referring again to FIG. 4, the signal waveform at the pin 92 is shown. In the first portion, the signal is pulled by the dataOutI signal at pin 124. When the signal is released it is boosted by the dataOutI transition so that there is a faster rise time. As indicated for this transition, the slew detector 122 indicates a rising input before crossing a logic input threshold provided by the block 114. During the second portion of the illustrated signal waveform, the signal at pin 92 is pulled down by some external slave I$^2$C device. The external device then lets go, and the waveform rises linearly (because of the capacitor load connected to that pin 92).

Figure 5:
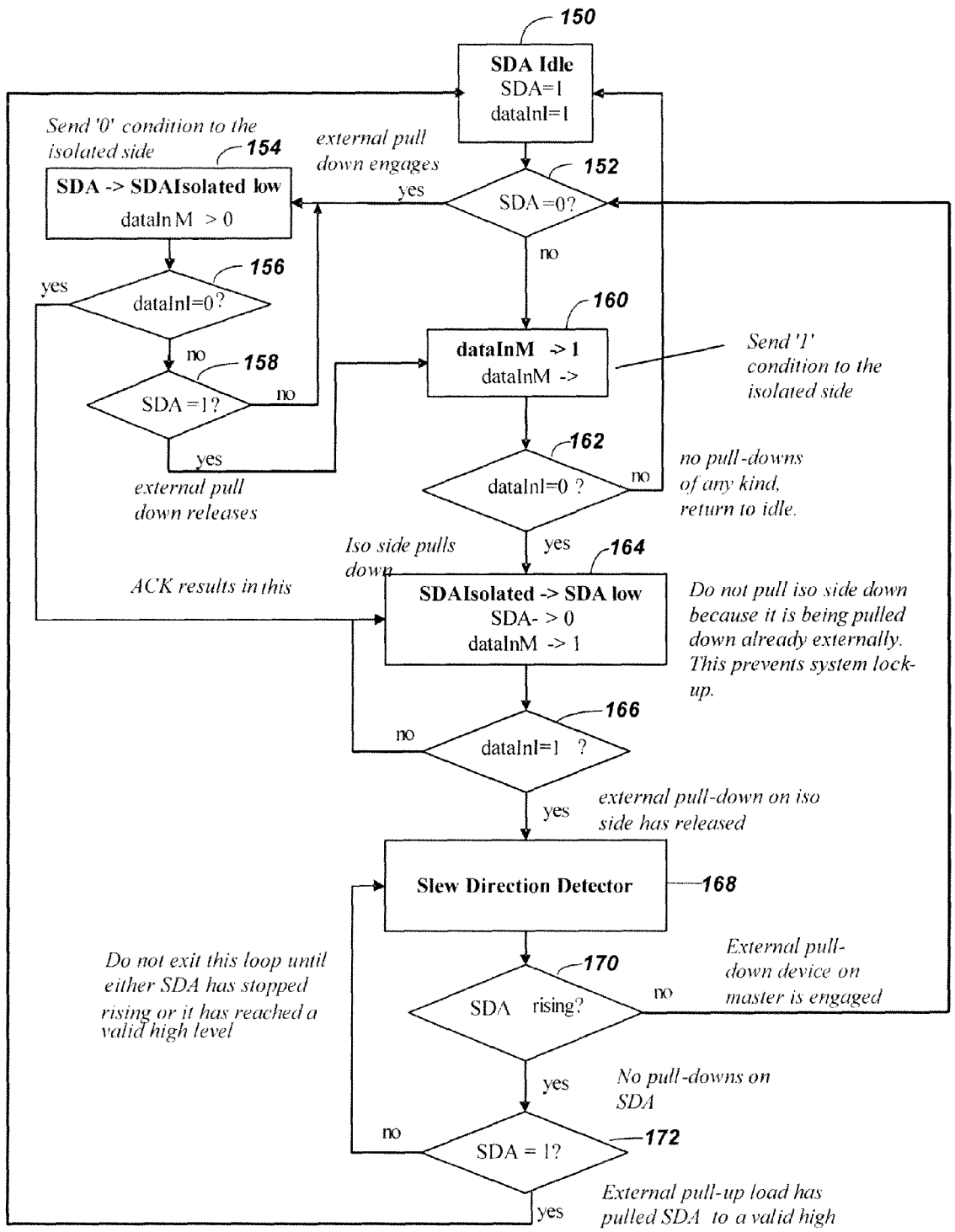
FIG. 5 is an embodiment of a flow chart illustrating the operation of one embodiment of the master domain logic of the master interface device illustrated in FIG. 2.

The flow chart shown in FIG. 5 illustrates the decision making process of the master interface device when operating to send data to and from the device. More specifically, the flow chart illustrates the operation of logic block 72 of FIG. 2. As indicated in FIG. 2, the output of block 72 at pin 74 is a function of the input signals at SDA port 62 and the pin 76. As shown in FIG. 5, the starting step 150 is where the SDA input at pin 62 is idle, and the states of the signals at the SDA port 62 and pin 76 are high. At step 152 the signal at the SDA port 62 is checked to see if the state of the signal has gone low. If no, the process proceeds to step 160, described hereinafter. If yes, the process proceeds to step 154, wherein the low signal at port 62 is to be sent to the dataInM pin 74. At step 156, the device queries whether the dataInI signal at dataOutM pin 76 in a valid low state. If it is in a valid low state, there is an ACK condition, and the process proceeds to step 164, described hereinafter. If it is not low, the process proceeds to step 158. At step 158, the query is made whether the signal at the port SDA is in a valid high state. If not, the process proceeds back and repeats steps 154 and 156. If yes, however, it means that an external pull down has been released, the signal has pulled up, and the process proceeds to step 160.

At step 160 the logic 72 provides a high dataInM signal at port 74 that is sent to the isolated side through the isolation barrier. At step 162 the process determines whether dataInI at pin 76 is in a valid low state. If not, there are no pull down conditions of any kind, and the system is in an idle state, with the process returning to step 150. If yes, the process proceeds to step 164 indicating that a signal is being received from the isolated side and the device should pull the signal at the SDA port 62 low. This results in the SDA signal at the SDA port 62 to go low, and the dataInM output at pin 74 to go high. Thus, step 164 prevents the master devices from pulling the isolated side down because it is being pulled down already by the isolated domain, and as a result prevents the master device 60 from locking up.

Proceeding to step 166, a determination is made whether dataInI signal at pin 76 is in a valid high state. If not, step 164 is repeated. If yes, the external pull down by the isolated interface device is no longer pulling down, releasing to a high state on the SDA pin, with the process proceeding to step 168 to determine the direction of change of the signal at the SDA port 62. At step 170 the process now looks at the output of the slew direction detector 82 to determine whether the signal at the SDA port is rising. If not, the process returns to step 152 and continues as previously described. If yes, the process proceeds to step 172 to determine whether the state of the signal at the SDA port is a valid high. If not, the process repeats step 168, 170 and 172, and keeps repeating them, until the answer is yes, indicating that the external pull-up load has pulled the signal at the SDA port to a valid high state and there are no devices pulling down on the SDA port. If, however, the answer is yes, the device is in an idle state, and the process returns to the step 150 and repeats the process steps from there.

Figure 6:
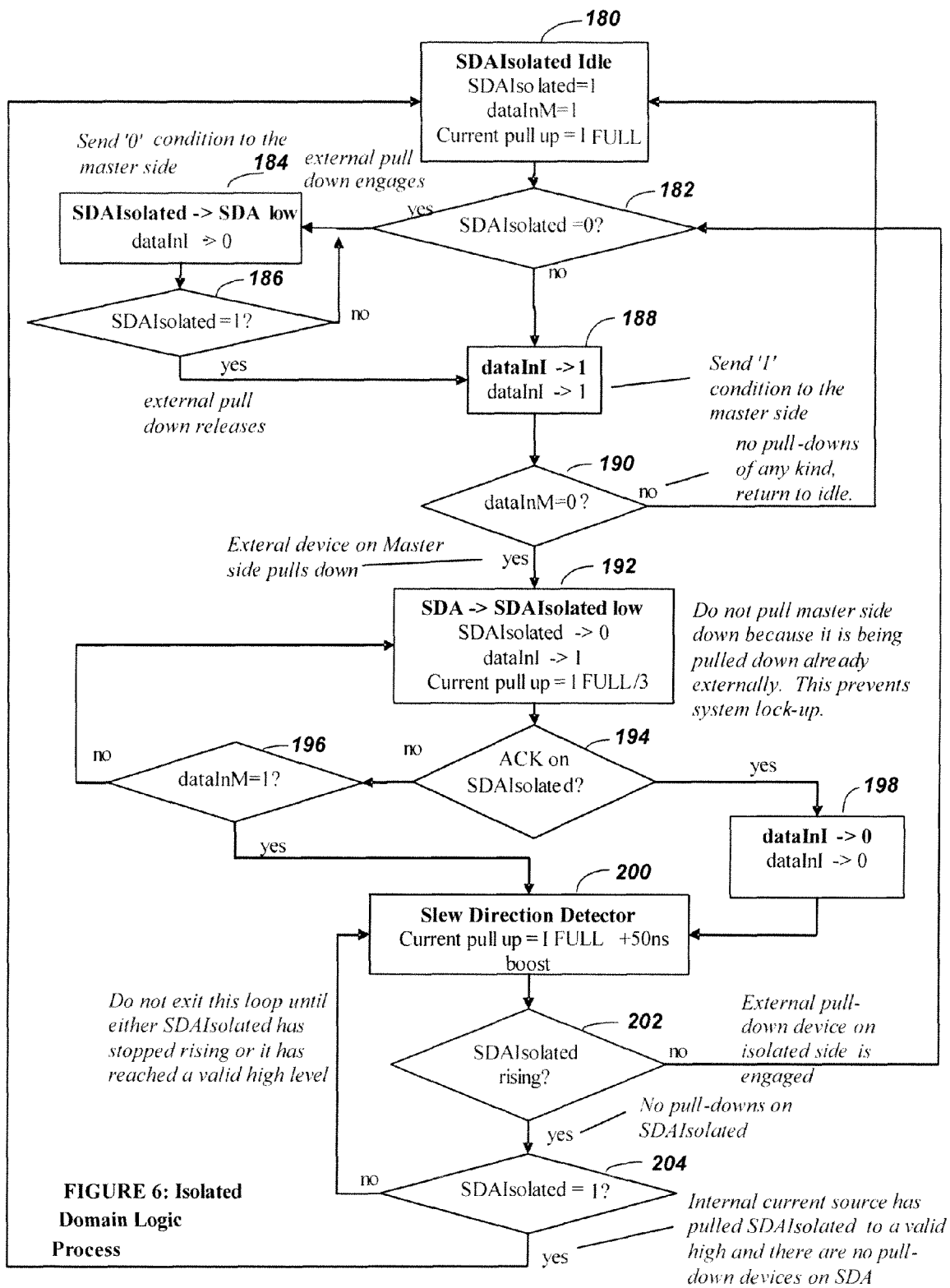
FIG. 6 is an embodiment of a flow chart illustrating the operation of one embodiment of the isolated domain logic of the isolated interface device illustrated in FIG. 3.

The flow chart shown in FIG. 6 illustrates the decision making process of the isolated domain when operating to send data to and from the device. More specifically, the flow chart illustrates the operation of glitch filter and logic block 114 of FIG. 3. As shown in FIG. 6, the starting step 180 is where the SDAisolated input at port 92 is idle, i.e., the states of the SDAisolated signal at the SDAisolated port 92 and dataInM signal at dataOutI pin 124 are high, and the current pull up is at a state referred to as "Ifull" (wherein the current sources 102 and 104 are both on so as to provide current to the SDAisolated port 92). At step 182 the signal at the SDA port 62 is checked to see if the state of the signal is low. If yes, the process proceeds to step 184 in order to process that signal by sending a signal (a low dataInI signal) to the master interface device indicating a "0 condition" from pin 116 of the isolated interface device to the pin 76 of the master interface device. The device proceeds to step 186 to see if the SDAisolated signal at port 92 goes high. If not, the device proceeds to continue in the loop defined by the steps 184 and 186. Once the SDAisolated signal at port 92 goes to a valid high state, the process proceeds from step 186 to step 188.

At step 188, the dataInI signal at pin 116 is driven high, which is communicated to pin 76 of the master interface device. The process then proceeds to step 190, wherein the status of the state of the dataInM signal at the pin 124 is checked to see if it is at a valid low. If not, there are no pull down conditions of any kind, and the device returns to the idle state, and the process returns to step 180. If however, the query at step 190 is answered yes, the signal on the SDA port of the external master interface device is pulling the SDAisolated port of the isolated interface device low. The process then proceeds to step 192, where the dataInI signal on pin 116 is driven high, and the current supply provided by the current source array 94 is set to provide a current pull up on the port 92 equal to about Ifull/3, by opening switch 108 so that only current from source 104 is provided. During this condition, the master domain side is not pulled down by setting dataInI to high, because it is being pulled down already externally. This will prevent system lockup.

At step 194, a query is made as to whether an ACK condition being indicated on the SDAisolated port 92. If not, at step 196 a determination is made whether the input signal dataInM provided from pin 74 of the master interface device has changed to a high. If not, the process repeats step 192 by continuing to drive the SDAisolated signal on port 92 low. The process continues in the loop defined by steps 192, 194 and 196, until at step 194 the an ACK condition is indicated on detector 120, or at step 196 the dataInM signal on pin 74 of the master device has gone high. If the ACK condition is indicated on detector 120, then the process proceeds to step 198, and the isolated device will send back a dataInI low signal from pin 116 to the master device, and the process proceeds to step 200. Similarly, if at step 196 the dataInM signal on pin 74 of the master device has gone high, then the process proceeds to step 200.

At step 200, the slew direction detector is checked to determine whether the SDAisolated signal on port 92 is rising, falling or staying the same, and the current pull up is programmed for a boost for a predetermined time, for example, current pull up is set for 2*Ifull for 50 ns. At step 202, the query is made as to whether the SDAisolated signal is rising using the slew direction detection block 122. If it is not rising, then an external device is pulling down on the slave I²C bus and the process returns to step 182. If however, the SDAisolated signal is rising, there are no pull downs on the SDAisolated pin 92, and the process proceeds to step 204. With the SDAisolated signal rising, at step 204, the determination is made whether the signal has reached a valid high using the input logic stage 112. If not, the process returns to step 200. If yes, the internal current source array 94 has pulled the SDAisolated pin 92 to a valid high. The process returns to step 180 and the idle state.

Figure 7:
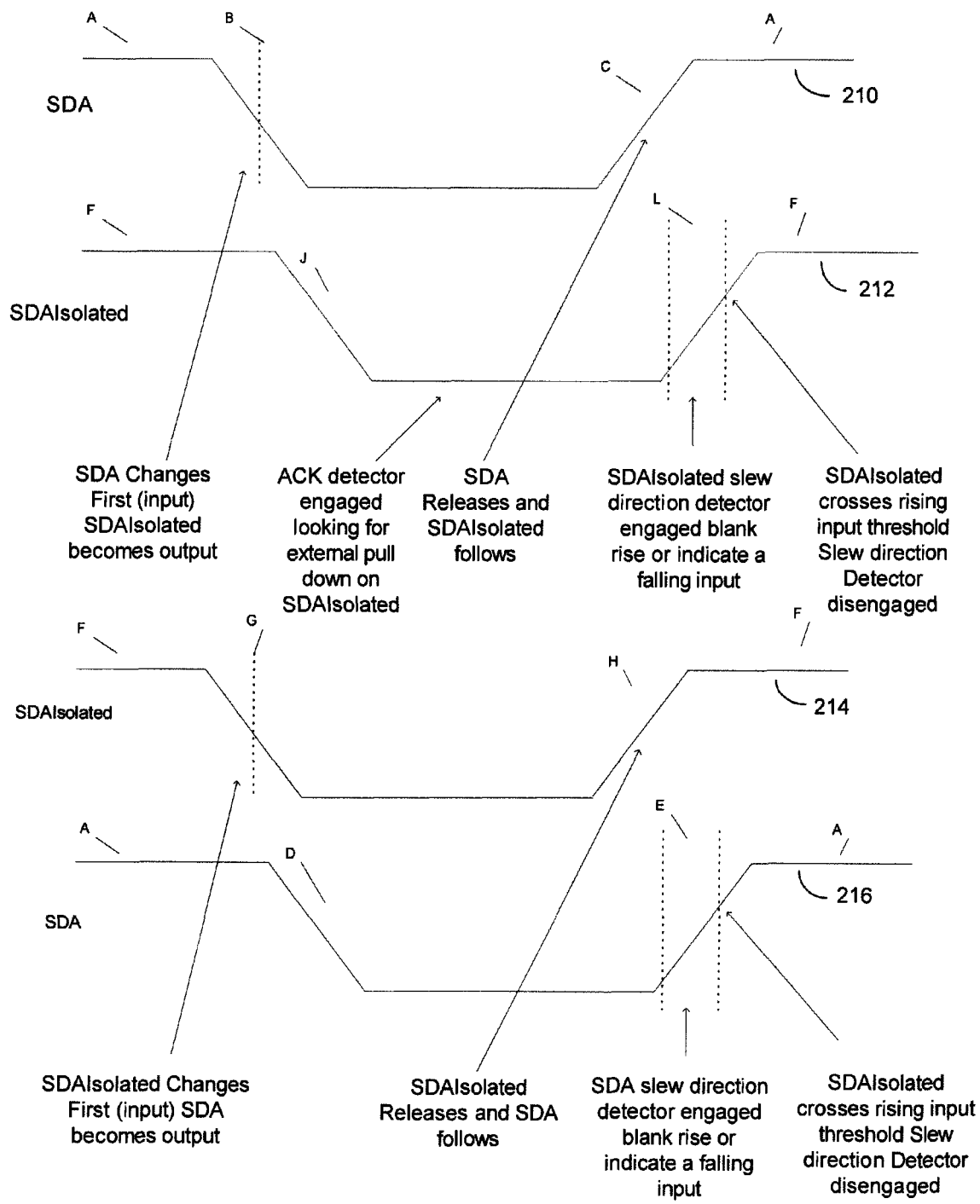
FIG. 7 are waveforms showing the SDA isolated signal generated in response to the SDA signal and the SDA signal generated in respond to the SDA isolated signal, the type described herein.

Referring to exemplary waveforms of FIG. 7, the top waveform 210 is the SDA signal at the port 62 of the master interface device illustrating the transitions from a valid high state to a valid low state, and back to a valid high state. The second waveform 212 is the SDAisolated signal on port 92 of the isolated domain that follows waveform 210. At the start of both waveforms, both are high, as can be seen at point A of the SDA waveform 210, and point F of the SDAisolated waveform 212. The SDA waveform 210 changes first transitioning to a low state at point B. That signal is sent to the SDAisolated port 92, so that it begins for transition low as point J. With both waveforms low, the ACK detector 120 is engaged looking for an external pull down on the SDAisolated port 92 of the isolated interface device. At point C of waveform 210, the master interface device releases the SDA. port 62 so that the waveform 210 rises, and the state of the signal on the SDAisolated port follows at period L of the waveform 212. During the period L, the slew direction detector 120 of the isolated interface device is engaged to determine whether the SDAisolated signal is rising or falling. At the end of the period L, the SDAisolated signal crosses the rising input threshold and the slew direction detector 120 is disengaged. The two waveforms return to the high state at A and F.

The second set of exemplary waveforms in FIG. 7 illustrate how the SDA waveform 216 follows the SDAisolated waveform 214. The waveforms behave similarly to that shown with respect to waveforms 210 and 212, except that it is the SDA waveform that follows the SDAisolated waveform. As shown, the SDAisolated waveform 214 and the SDA waveform 216 both start high at points F and A, respectively. Waveform 214 starts to transition from a high state to a low state at point G when the SDAisolated waveform changes first so as to responsively change the SDA waveform so that that latter transitions to a low state. At point H, the isolated interface device releases the SDAisolated signal and the SDA waveform follows. During the period E that the SDA waveform is rising the slew direction detector 120 is engaged so as to determine whether the SDA signal waveform is rising or falling. When the SDAisolated waveform crosses the rising input threshold of the slew direction detector 120 at the end of period E, the slew direction detector is disengaged. The waveforms then return to the high state as indicated at F and A.

It should be noted that while all of the features are described with respect to the transmission of data through the SDA and SDAIsolated ports, the same features can be applied to the clock bus SCL and SCLIsolated ports (not shown). Further, while the components used in the slave device with the ACK detector 120 to detect the ACK signal received from the master device, similarly the master device can be provided with similar components to detect an ACK signal from the isolated device.

The system described provides an improved I²C isolated, bidirectional communication system with isolated domain current source pull-ups, including improved features to detect data direction, maintain signal direction and detect an I²C acknowledge (ACK) signal. The disclosed system and method overcomes the disadvantage of using a forced voltage level at or above the specified voltage output low by using a current comparator and controlled current sources to monitor the isolated SDA signal. The controlled current source allows the output signal to be driven below the specified voltage output low level and allows monitoring of the signal for ACK conditions, while maintaining fast switching speeds.

The components, steps, features, objects, benefits and advantages which have been discussed are merely illustrative. None of them, nor die discussions relating to them, are intended to limit die scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim means that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

What is claimed is:

1. A communication system containing two or more communication interface devices for communicating between separate I²C busses, a communication interface device of the two or more communication interface devices comprising:
   a current source internal to the communication interface device, the current source being connected to one of the I²C buses and arranged to pull the one I²C bus to a logic high level in the absence of an active pull down device on the one I²C bus;
   a pull down component connected to the one I²C bus arranged to pull down the one I²C bus to a logic low level; and
   a detector configured to detect when a remote communication interface device is pulling the signal level on the one I²C bus to a logic low level meeting the I²C specification at the same time as the communication interface device is pulling the signal level on the one I²C bus to a valid logic low meeting the I²C specification, wherein the detector includes a comparator arranged to compare the ratio of current in the pull down component to the total current supplied by the current source.

2. A communication interface device according to claim 1, wherein the comparator includes a pair of inputs, wherein one of the inputs is a function of the flow of current in the pull down component and the other input is a function of the total current supplied by the current source.

3. A communication interface device according to claim 1, wherein the one I²C bus includes an isolation barrier so that the two interface devices are isolated from one another.

4. A communication system of claim 1 further comprising:
   a logic and storage device configured to maintain the direction of the data flow on one of the I²C buses based on which system pulls the signal from a logic high to a logic low first.

* * * * *